Figure 1:
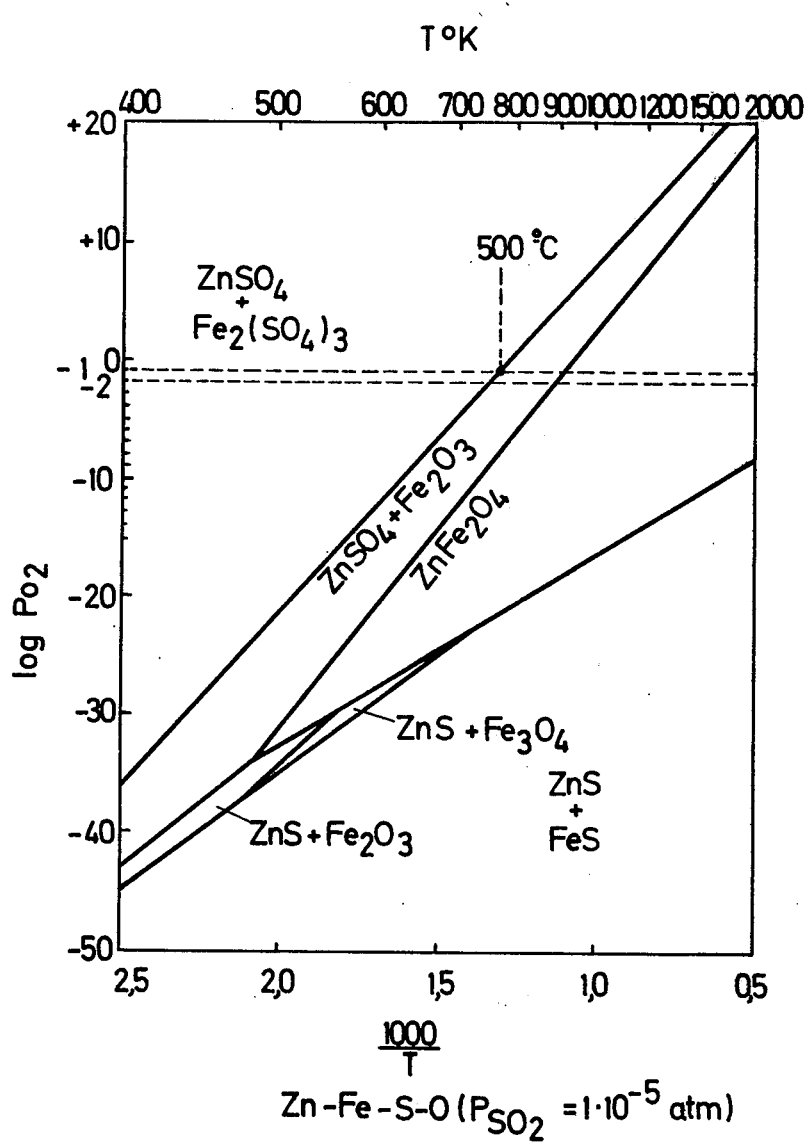

United States Patent [19]

Pavonet

[11] 4,129,454

[45] Dec. 12, 1978

[54] IRON OXIDE BASED PIGMENT AND PROCESS FOR PREPARING SUCH A PIGMENT

[75] Inventor: Wilhelm E. Pavonet, Flemalle-Haute, Belgium

[73] Assignee: Societe de Prayon, Belgium

[21] Appl. No.: 646,609

[22] Filed: Jan. 5, 1976

[30] Foreign Application Priority Data

Jan. 3, 1975 [NL] Netherlands .......................... 7500055

[51] Int. Cl.$^2$ ................................................ C09C 1/24
[52] U.S. Cl. ...................................... 106/304; 423/106; 423/633
[58] Field of Search ................. 106/304; 423/106, 633; 75/101 R, 115, 120

[56] References Cited

U.S. PATENT DOCUMENTS

| | | | |
|---|---|---|---|
| 1,834,960 | 12/1931 | Mitchell | 423/106 |
| 2,007,233 | 7/1935 | Wespy | 106/304 |
| 3,341,347 | 9/1967 | Lewis et al. | 423/633 |

FOREIGN PATENT DOCUMENTS

| | | | |
|---|---|---|---|
| 593269 | 2/1934 | Fed. Rep. of Germany | 106/304 |
| 1667850 | 8/1971 | Fed. Rep. of Germany | 106/304 |

OTHER PUBLICATIONS

Chemical Abstracts, vol. 81, 1974, p. 178, entry 172438n.
Chemical Abstracts, vol. 75, 1971, p. 161, entry 23341Z.
Journal of Applied Chemistry and Biotechnology, vol. 22, 1972, "The Effect of Temperature on the Properties of Calcined Red Iron Oxide Pigments," pp. 1209–1215.

Primary Examiner—Winston A. Douglas
Assistant Examiner—J. V. Howard
Attorney, Agent, or Firm—Weiser, Stapler & Spivak

[57] ABSTRACT

An iron oxide based pigment in alpha-$Fe_2O_3$ form, which contains the water insoluble part obtained by calcination of basic iron sulfate and/or jarosite based residues, this pigment being prepared by a process comprising calcining at a temperature from 600° to 800° C and during a period from 2 to 240 minutes basic iron sulfate and/or jarosite based residues, so as to decompose in an incomplete manner such basic iron sulfates and/or jarosite and to obtain in the calcined product an iron bonded sulfur content of more than 0.6%, and solubilizing the not decomposed iron sulfates with other soluble sulfated metals, such as zinc sulfate, by lixiviating the calcined product, these water-soluble compounds being then separated by appropriate processes.

17 Claims, 2 Drawing Figures

IRON OXIDE BASED PIGMENT AND PROCESS FOR PREPARING SUCH A PIGMENT

The present invention relates to an iron oxide based pigment in alpha-$Fe_2O_3$ form.

Different pigments of said type are already known.

The pigment according to the present invention is distinguished from such known pigments, essentially by the fact that it is produced from a raw material different from those of the known pigments.

Another, even more important difference of the pigment according to the invention compared to known pigments of the same kind is that the pigment according to the invention is produced from a raw material, the commercial and industrial value of which was either null or very small till now.

While there exists a method to transform the latter raw material into a product capable of being used as an ore in iron metallurgy, in view of its fairly low iron-content, it would appear that the costs involved for the transformation thereof into such a product may hardly be covered by the industrial advantages resulting from its use as iron ore. For this reason, it does not seem that this method has been used on an industrial scale.

The pigment according to the invention is characterized in that it contains the water-insoluble part of the product obtained by calcination of basic iron sulfate and/or jarosite based residues.

The invention further relates to a particularly advantageous method for producing such pigment which makes it possible to obtain in a fairly simple manner practically by mere variation of calcination, the desired color of the pigment while using the same raw material.

According to the invention, this particular method comprises calcining at a temperature from 600° C. to 800° C. and for a period from 2 to 240 minutes, basic iron sulfate and/or jarosite residues, so as to decompose in an incomplete manner such basic iron sulfates and/or jarosites, and to maintain so in the calcined product an iron bonded sulfur content of more than 0.6%, and solubilising the not broken down iron sulfates with soluble sulfates of other metals, such as zinc sulfates, by lixiviating the calcined product with water, these compounds being then separated.

Advantageously in order that the method shall become as profitable as possible and that the quantity of residual products shall be restricted, the liquid resulting from said lixiviation of the calcined product is brought at a temperature of at least 60° C., preferably at least 80° C., to a pH of about 3 by adding an alkali or ammonia in order to remove the iron contained therein by precipitation as jarosite, this liquid being subsequently directed after separation of the iron precipitate towards preparing the zinc sulfate solutions to be used for electrolysis.

Other details and features of the invention will become apparent from the description hereinafter given of the possibilities of obtaining the starting product by means of which the pigment according to the invention is produced, also from the description of the processing of this starting product in order to obtain the subject pigment, including the influence on the properties thereof, of the different parameters of such a processing with reference to the attached graphics, and finally of some specific examples of preparing the pigment according to the particular method of the present invention.

The alpha-$Fe_2O_3$ based pigment according to the invention comprises as essential product giving the coloration, the water-insoluble part obtained after calcination of basic iron sulfate and/or jarosite based residues which can mainly result from the preparation of zinc sulfate solutions from roasted blende and which are to be used in electrolysis for zinc extraction.

Although alpha-$Fe_2O_3$ based pigments have been known for a long time, the fact that the pigment according to the invention contains a coloring product, a product of another origin than the standard $Fe_2O_3$ based pigments gives it a distinct characteristic.

In order to produce the pigment according to the invention by means of said raw materials, i.e. the basic iron sulfate and/or jarosite based residues, it is essential to be able to ajust the calcination temperature throughout the mass of materials to be calcined, in order to afford the pigment a colour as uniform as possible and moreover to be able to reproduce exactly the same conditions of calcination in order the pigments resulting from two different calcinations shall be comparable as regards quality and colour.

The invention mainly aims to use iron containing residues obtained when preparing zinc sulfate solutions to be used for electrolytic zinc production.

In order to prepare such solutions, the roasted blende is attached with spent zinc solutions resulting from electrolysis by protecting roasted blende in excess with reference to sulfuric acid contained in the spent solutions. This operation is termed neutral attack.

Subsequently, the solutions are separated from the solid attack residues. These solutions contain the zinc sulfate and are directed towards a special process prior to electrolysis in order to purify them.

The solids comprise zinc, practically all the iron and practically all the lead.

These solids are mashed again in a new quantity of spent electrolysis solutions and concentrated sulfuric acid is added. This operation is termed acid attack. Thereby the remainder of the zinc and nearly the whole of the iron are solubilized. The solid residue is then separated from the acid solution. This solid residue contains practically all the lead, all the silver, a large quantity of silica and some iron and zinc. A new quantity of roasted blende is used for a gradual hot neutralisation of the acid solution.

This solution is brought to a pH from 2 to 4, so as to precipitate the iron as basic iron sulfate. If the solution contains $NH_4$, Na or K ions, the precipitate consists of jarosite A $Fe(SO_4)_2 \cdot 2Fe(OH)_3$ wherein A represents an alkali or ammonia. This precipitate is of yellow colour and micro-crystalline structure.

Lastly, this basic iron sulfate and/or jarosite residue is separated from the solution and washed, while the solution is recycled towards the said neutral attack.

This residue therefore contains in addition to practically the whole of the iron from the roasted ores, also sulfate sulfur, alkali or ammonia, as well as zinc, copper, lead, manganese originating particularly from the roasted ore used when precipitating the iron and which was not fully attached.

Below is given a typical analysis of such a residue after filtration:

Humidity: 40–45%
Fe: 28–32% on dry material
$SO_4$: 30–40% on dry material.
Zn: 1–2% on dry material.
Pb: 0.5–2% on dry material.

$N_{amm}$: 2-2.5% on dry material.

As method of production of such residue is disclosed a.o. in the Austrian Pat. No. 279,188 and in the U.S. Pat. No. 3,434,798.

These known methods produce a residue containing, in addition to iron, still zinc, copper, manganese and lead in the form of water-insoluble compounds.

The zinc is mainly present in the form of zinc ferrite and, consequently, is likewise insoluble in acids of weak concentration, even in the hot condition.

U.S. Pat. No. 1,834,960 discloses a method for processing such residue by drying and subsequent calcination of the dry product at a temperature of 500°-600° C. The object of this operation is to decompose the basic iron sulfates into $Fe_2O_3$ and $SO_3$ and to sulfate the insoluble zinc, copper and manganese compounds by the formed $SO_3$. In order not to decompose in turn the formed zinc sulfates, etc, the process provides to limit the maximum processing temperature to 650° C. If the sulfate content of the residue is unadequate to dissolve the zinc, it is foreseen to add ferric sulfate to the residue or to pass a $SO_2$ containing gas through the calcinator wherein the processing of the subject residue takes place.

Subsequently, the calcined product is lixiviated with water. The slurry thus formed is filtered and the cake is washed, drained, dried and directed towards to the lead metallurgy.

The solution containing zinc, copper, cadmium, manganese is sent towards the said neutral attack.

A similar process has been disclosed in the patent application No. 22 08 092 filed in the German Federal Republic. In this process, the residue is dried and calcined at a temperature from 600° to 680° C. In order to obtain the complete dissolution of the zinc and the complete insolubilisation of the iron, the method lays down processing temperatures in relation of the partial pressure of the oxygen in the processing gas and of the $SO_2$ concentration. This temperature varies according to such concentrations and particularly depending on the $SO_2$ contents.

At low $SO_2$ contents, i.e. less than 0.01% by volume, the temperature is 600° C., while for high $SO_2$ contents of 5 to 10% magnitude, the temperature rises to 670°-680° C. It is a question of selecting the calcination temperature and the partial oxygen and $SO_2$ pressures in such a manner as to be in the stability range of $Z_nSO_4$ + $Fe_2O_3$ in the $Z_n$-Fe-S-O system - temperature diagram. In order to achieve a thorough zinc sulfation, the method lays down the following working conditions: intimate contact between zinc ferrite pellets and the $NaFe(SO_4)_2Fe_2O_3$ phase, an adequate $SO_3$ content, an adequate alkali content, an accurate control of the temperature when working in a fluisided bed. As fuel, the method provides using pyrite and sulfate. After calcination, the calcined product is mixed with water, filtered, washed and the filtration cake so formed is drained and dried.

The calcined product so obtained comprises 67% of iron and 0.15% of zinc. Then this calcined product can be used in iron metallurgy as ore, while the solution containing zinc and alkali is sent to the neutral attack.

It will be noted that this method aims simultaneously at the nearly total insolubilisation of the iron by the complete decomposition of the iron sulfate, and at a total sulfation the zinc in order to obtain its nearly complete solubilization.

For that purpose, this method comprises calcination in such conditions that the $ZnSO_4$ + $Fe_2O_3$ system is stable and also a long enough calcination so as to obtain the nearly complete decomposition of the iron sulfate, as it results more particularly from the practical examples given at the end of the specification of this German patent application.

Under these working conditions, it is substantially impossible to obtain an iron oxide suitable as a pigment. This oxide presents indeed generally speaking a blackish aspect.

In the method according to the invention, a calcination of the basic iron sulfate and/or jarosite based residue is also carried out. This calcination is however made in a quite different manner in order to obtain a product as a pigment.

In this respect, it is extremely important that the calcination temperature itself, i.e. that inside the products to be calcined shall be perfectly controlled throughout the mass of the product to be calcined. Indeed, a local overheating within the mass to be calcined results in creating a product of unwanted colour, such as a blackisch colour.

In the method according to the invention, it is provided to calcine at a temperature between 600° and 800° C., i.e. at temperatures which might possibly correspond to those of the method according to the said German patent application.

However, the calcination conditions are selected with reference to the desired tint and in such a manner to decompose as well the iron sulfate and/or jarosite contained in the residues in an incomplete manner, so as to maintain in the calcined product an iron-bonded sulfur content of more than 0.6%. Subsequently, the not decomposed iron sulfates, as well as other soluble sulfates, such as zinc sulfate, are then solubilized in water, these soluble compounds being then removed, for instance by filtration and washing.

Figure 2:
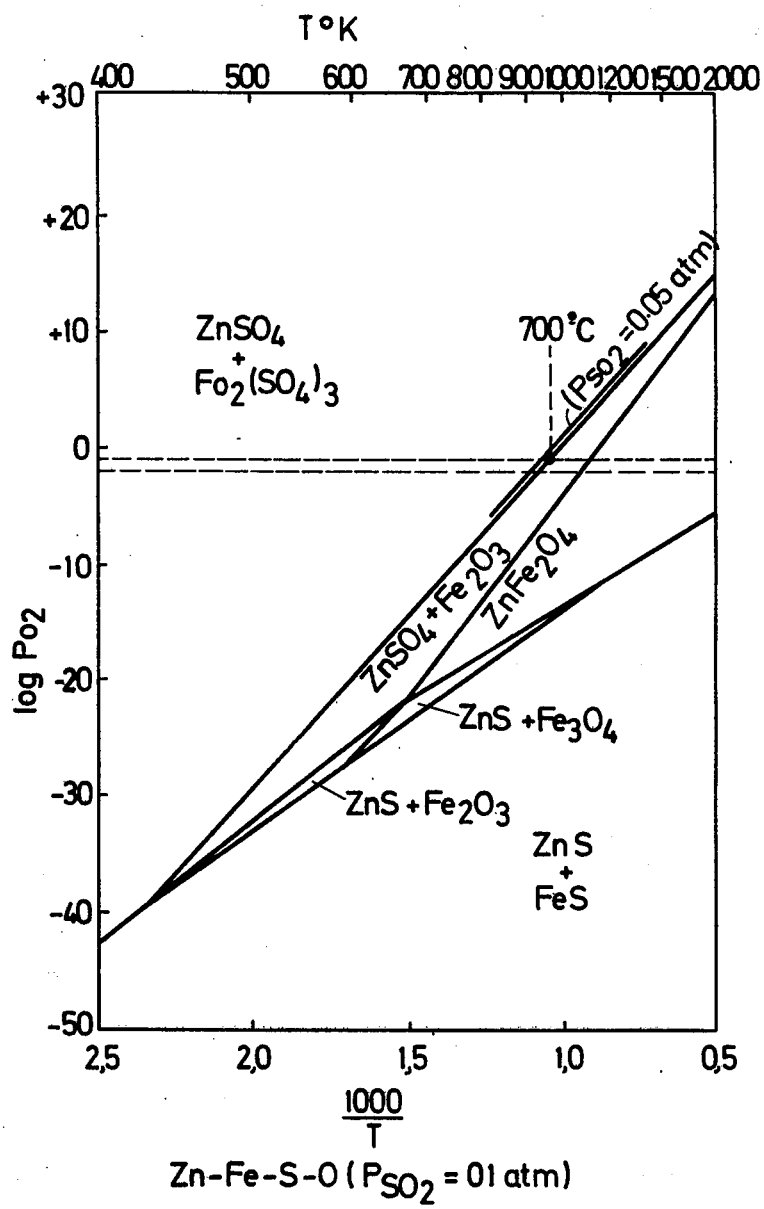

In order to obtain a pigment of satisfactory quality, the calcination conditions are adjusted as follows. On attached FIGS. 1 and 2, lines have been traced defining the stability regions of the $ZnSO_4$ + $Fe_2O_3$ system. The decomposition reaction of the ferric sulfate into $SO_3$ and $Fe_2O_3$ starts as soon as for a given gaseous phase, the temperature given by the line separating the stability area $ZnSO_4$ + $Fe_2(SO_4)_3$ from the stability area $ZnSO_4$ + $Fe_2O_3$ is exceeded.

As according to the invention the calcination takes place in the presence of a considerable oxygen excess, the decomposition temperatures are given by the intersection of the lines running parallel to the axis of the abscissa, passing through the ordinate log $PO_2$ = $-1$ to $-2$. It will be noted that the decomposition of the iron sulfate starts at about 770 T° K., i.e. at about 500° C. in a gaseous phase of very low $SO_2$ content and at 700° C. in an atmosphere with a very rich $SO_2$ content. In $SO_2$ rich atmosphere (above 5%), temperatures exceeding 700° C. must therefore be reached in order to obtain a reasonnable rate of iron sulfate decomposition. On the contrary in a gaseous phase with a very low content of $SO_2$, this decomposition already takes place at reasonable rates at 600° C. and up. As the decomposition reaction is highly endothermic, it will be very difficult to increase the temperature of the product being decomposed much above the initial decomposition temperature, as the input of the calories required rises more and more and proves difficult to transfer. Thus as long as the quantity of not decomposed iron sulfate shall remain considerable, the temperature of the material being decomposed shall be a function of the $SO_2$ content of the gaseous phase.

In order to obtain pigments of reddish orange tint, it is necessary to decompose the iron sulfates at low temperatures comprised between 600° and 700° C. It is therefore necessary to operate with a gaseous phase of a fairly low $SO_2$ content (of 0.1 to 1% magnitude for example).

In order to obtain pigments of red colour, the iron sulfates must be decomposed at a higher temperature (above 700° C.). In order to achieve this it is necessary to work with $SO_2$ rich gaseous phase. The duration of the calcinations will vary in inverse ratio of the decomposition rate, which in turn is proportionate to the input of calories and therefore to the difference in temperature between the temperature of the sulfates in course of decomposition and the initial decomposition temperature.

To sum up, in order to obtain pigments of satisfactory quality, it is necessary to select the $SO_2$ concentration in the gaseous phase depending on the desired tint, to carry out calcination at a sufficiently high temperature in order to achieve a reasonable rate of decomposition, and to stop calcination before reaching complete decomposition of the ferric sulfate.

In practice, calcination is carried out in such a manner as to obtain a global sulfur sulfate content of 2.1 to 5% in the calcined product, whereas the sulfate sulfur resulting from the zinc, copper, lead, soda and potash corresponds for instance to about 1.5%.

The selection of the calcination temperature is therefore essential in order to obtain the desired tint.

It should be noted that the calcination temperatures referred to above are those prevailing in the actual mass to be calcined, assumed to have been made homogeneous by agitation.

The invention consists in fact of proposing a calcination method during which it is possible to control the calcination temperature at an industrial scale level, within limits suitable for producing the pigment.

The invention provides more particularly selecting decomposition temperature with reference to the desired tint of the pigment being produced and adjusting the $SO_2$ content of the calcination atmosphere to that decomposed temperature. Moreover, care is taken not to decompose the whole of the basic iron sulfates and/or jarosite by maintaining in the calcined product an ironbonded sulfur content exceeding 0.6%.

It should also be noted that when achieving a pigment as it is the case in the method according to the present invention is aimed at, it is impossible to use with direct heating pyrite and coal as fuel; the residues of these two fuels would actually contaminate the calcined product. On the other hand, sulfur, hydrogen sulfide, as well as natural gas and liquid and gaseous hydrocarbons, which do not leave combustion residues, are prefectly suitable.

It is possible to calcine the residue by indirect heating by introducing it inside a heat-resisting steel cylinder rotating about the axis thereof and heated from the outside. The indirect heating offers the great advantage of automatically separating from combustion gases, the gases of sulfate decomposition which are $SO_2$, $SO_3$ and oxygen. This makes it easier to recover both $SO_2$ and sulfuric acid contained in such decomposition gases, as well as the calories contained in the combustion gases. Moreover, such a heating system allows to ajust in a very flexible manner the $SO_2$ and $O_2$ content of the gaseous phase by controlling the intensity of scavenging by means of air or by a $SO_2$, oxygen and nitrogen containing gas of the cylinder interior. In order to obtain a red pigment it is easy e.g. to carry calcination in an atmosphere with a very high $SO_2$ and $O_2$ content.

Another appropriate means of calcination is direct heating the dried residue laid out in a thin layer e.g. on a conveyor belt inside a tunnel furnace or on plates carried on carriages passing through the same furnace. In this type of heating, the heat transmitted by radiation and subsequently by conduction enters very slowly inside the thin layer, whereas the decomposition gases diffuse in opposite direction. The residue to be calcined is therefore constantly surrounded by a gas with a rich $SO_2$ and $O_2$ content and decomposes consequently, at a high temperature.

This type of calcination may be improved by working dried and pelleted residues, the heat penetrating at a faster rate in the layers and the processing capacity being higher per heated area square meter.

It is also possible to calcine the product by direct counter-current heating in tubular furnaces comprised of a cylinder rotating about the axis thereof or in a stage furnace comprising rakes. These furnaces which are of conventional type present the disadvantage of producing dusts drawn with and by the combustion gases and which have to be recycled. It is possible to reduce the removal as dusts by a preliminary agglomeration of the residue to be calcined.

It is however difficult to find an agglomeration additive which shall not harm the tint of the pigment while, on the other hand, agglomerating without additive is not very efficient. It is therefore a question of the furnace being dimensioned in such a manner as to reduce to a minimum removal in the form of dusts of the product to be calcined by reducing the rates of gas flow inside the furnace and by ruling out in the case of the cylindrical furnace, the fines, angles, etc., which have for their object to agitate the product to be heated and produce therefore the dusts. The dimensions of the furnace are advantageously selected in such a manner that the rate of flow of the gases shall be less than 5 m/sec.

Lastly it is still possible to use for implementing the calcination a fluidised bed or a heating in a gaseous suspension. As dry jarosite is very fine, it will be impossible to retain it in a fluidised bed when all the calories are to be introduced by the combustion gases, and this treatment therefore will correspond rather to a suspension heating rather than in a fluidised bed.

Prior to calcination, it is possible as the case may be, according to the invention, to mix the residue in the dry state with crushed sulfur or again to granulate with melted sulfur. The use of sulfur offers considerable advantages particularly in the case of calcination by indirect heating or in the thin layer. Sulfur actually boils at 445° C. It will therefore distill and thus burn while the basic iron sulfate comprises already a substantial dissociation tension. This sulfur will react at least in part with the sulfate oxygen, the remainder burning in the furnace atmosphere. It will therefore cooperate efficiently in order to supply, as a whole or in part, the calories required for decomposing the basic iron sulfate.

When using an indirect heating calcinator, the addition of sulfur to the residue to be calcined will permit reducing the quantity of calories to be supplied through the furnace wall. In the case of thin layer calcination the entry of the calories inside the layer will be very much supported by the reaction of the sulfur with oxygen diffusing towards the layer and sulfate oxygen.

In the case of furnaces with direct heating, of tubular or plate type, the sulfur will act as a very efficient fuel for transmitting the calories to the product to be calcined. In the apparatus comprising a fluidised bed, the sulfur, particularly if it has been used for granulating the dry residue, will permit injecting calories into the fluidised bed and to retain the residue to be calcined therein for a specific time before being reduced into dusts and being drawn away in dust form together with the combustion gas. Sulfur therefore favours the calcination by supplying directly calories in the vicinity of the product to be calcined.

As the sulfur introduced in the calcination process consumes oxygen in order to form $SO_2$, it is necessary to limit the quantity of such admitted sulfur; it is e.g. necessary to prevent introducing a quantity of sulfur higher than 100% of the content of sulfate sulfur in the residue. Account is also to be taken of the oxygen content in the gaseous phase; for example, in a gaseous phase of low oxygen content, the quantity of sulfur added must be reduced.

On the other hand, ferrous sulfate also may be introduced in the basic iron sulfate or jarosite residue to be calcined. The iron of ferrous sulfate oxidises during calcination and allows to obtain a very satisfactory pigment with the calcined residue.

In the method according to the invention, it is therefore possible to consider calcination of basic iron sulfate and/or jarosite residues with or without addition of sulfur or ferrous sulfate on condition to carry out calcination in such a manner as to have a portion of sulfate sulfur bonded to the not decomposed iron.

This not decomposed iron sulfate is solubilised by a lixiviation of the calcined product with zinc sulfate and other soluble compounds. Generally speaking, a coloured solution containing e.g. 10 gr zinc and 5 to 15 gr iron is obtained, having a strongly acid reaction. This solution containing from 2 to 10% of worked iron may be heat-treated with an alkali so as to bring the pH down to about 3.

This allows to precipitate again this iron as jarosite leaving zinc, copper and manganese in solution. This iron precipitate in the form of jarosite is separated from the solution, the latter being sent to the preparation of zinc sulfate solutions for electrolysis.

Specific examples of calcination hereinafter given allow to illustrate further the essential characteristics of the method according to the invention.

EXAMPLE 1

The residue to be calcined contains 28% iron, 12% sulfur, 1.5% zinc, 0.1% copper and 0.2% manganese. This residue is calcined at a temperature of about 750° C. in an atmosphere containing 10% $SO_2$ and 25% oxygen (% by volume) for about 30 minutes.

The calcined product contains about 52% iron, 3% sulfate sulfur, 2.8% zinc, 0.2% copper, 0.5% lead and 0.38% manganese. Its water soluble iron content is 1.8%. Its iron bonded sulfur content is therefore of about 1.3%.

The residue thus calcined is then cold mashed again in water at a ratio of 500 kg of solid per cubic meter of water and stirred for 1 hour. The slurry so obtained is then filtered and the cake retained on the filter is washed. This cake contains 40% humidity, 60% iron, 0.5% zinc, 0.1% copper and 0.1% manganese, the percentage of these metals being calculated on the dry material of the cake. When dried at 100° C. and crushed, it yields a reddish tinted pigment.

EXAMPLE 2

The same residue as that used in Example 1, is calcined at 650° C. in an atmosphere containing 0.5% $SO_2$ and 10% oxygen for 120 minutes.

The calcined product is powdery and contains about 50% iron, 4% of sulfate sulfur and 2.6% zinc. The not decomposed iron bonded sulfur content is about 2.5%.

This calcined product is subsequently cold mashed again in the same ratio as in example 1 and yields a dry residue of the same composition but of orange tint. The remashed liquid contains about 13 gr. per liter of zinc and 16 gr. per liter of iron, as well as 19 gr. per liter of sulfate sulfur.

This solution is brought hot at a pH of 3 by addition of $NH_3$ in order to precipitate the dissolved iron and after filtration, the solution containing 13 gr. per liter of zinc and 1 gr. per liter of iron is sent to the preparation of electrolysis solutions for zinc production.

EXAMPLE 3

The residue used gives the same analysis as that of the Example 1 and after having been dried and pelleted it is calcined in a thin layer of 30 mm for 4 hours at 750° C. The gaseous atmosphere of the furnace contains 0.5% $SO_2$ and 10% oxygen. Thanks to the residue emitting during its calcination $SO_2$ and oxygen, this residue is surrounded by an atmosphere with a very high oxygen and $SO_2$ content. After calcination, the residue contains 50% iron, 5% sulfate sulfur and 2.5% zinc. A reddish tinted pigment is obtained after lixiviation in water, filtration, washing, drying and crushing.

EXAMPLE 4

The residue of same type as that in the preceding example is mixed in the dry state with 10% crushed yellow sulfur and is calcined by indirect heating in a cylindrical furnace in heat-resisting steel at a temperature of 700° C. for 30 minutes. It will be noted that the pigment obtained is of red colour. The sulfate sulfur amount is 3%.

EXAMPLE 5

The same residue as that used in preceding examples is hot pelleted with 12% sulfur and then fed to a fluidised bed furnace. The fluidised bed consists of roasted pyrite pellets and is heated by the combustion gases of natural gas which maintain the fluidised bed at a temperature of about 650° C.

The pellets of the residue to be calcined enter the fluidised bed where they desintegrate in accordance with the disappearance of sulfur by evaporation and combustion, until they form a fine powder calcined in suspension at about 800° C. for about 2 minutes before being separated in a cyclone and/or a recovery furnace. The calcined product contains about 3% sulfate sulfur and is of reddish tint.

In the various examples, the composition of the gaseous atmospheres is given in oxygen and $SO_2$ volume percentages, whereas actually a portion of the oxygen is combined with $SO_2$ in form of $SO_3$.

It is well understood that the invention is not limited to the described embodiments and that many changes may be introduced therein without departing from the scope of the present patent application.

This invention may also be applied to basic iron sulfate and/or jarosite residues originating from other sources than those hereinbefore mentioned.

I claim:

1. A process for producing iron oxide based pigment in alpha $Fe_2O_3$ form, comprising calcining at a temperature from 600° to 800° C. and during a period from 2 to 240 minutes a starting material which consists of basic iron sulfate residues and/or jarosite based residues, said residues having resulted from the preparation of zinc sulfate solutions from roasted blende and therefore containing at least zinc impurities, so as to decompose such basic iron sulfates and/or jarosite, performing the calcining in an atmosphere containing $SO_2$ in gaseous phase and controlling the $SO_2$ content of said atmosphere to produce a pigment of the desired color shade, discontinuing the calcining at a time within said period at which the calcined product still has an iron bonded sulfur content of more than 0.6%, solubilizing the not decomposed iron sulfates with other soluble sulfated metals, such as zinc sulfate, by lixiviating the calcined product, and separating these water-soluble compounds.

2. A process as claimed in claim 1, comprising adjusting, during the said calcination, the temperature of decomposition of the basic iron sulfate and/or jarosite depending on the tint desired by varying the $SO_2$ content of the atmosphere in which calcination is carried out.

3. A process as claimed in claim 2, wherein in order to obtain a reddish pigment, calcination is carried out at a temperature above 700° C. in an atmosphere containing at least 4% of $SO_2$ and during a period varying from 2 to 240 minutes, the shorter periods corresponding to the highest temperatures.

4. A process as claimed in claim 2, wherein in order to obtain an orange pigment, calcination is carried out at a temperature below 700° C. in an atmosphere containing less than 4% of $SO_2$.

5. A process as claimed in claim 2, further comprising bringing the liquid resulting from the said lixiviation of the calcined product, at a temperature of at least 60° C., to a pH of about 3 by means of an alkali or ammonia in order to remove by precipitation from such liquid the iron contained therein as jarosite, and subsequently utilizing such liquid in preparing the zinc sulfate solutions to be used for electrolysis.

6. A process as claimed in claim 2, wherein calcination is carried out by indirect heating, the atmosphere in contact with the product to be calcined being adjusted by a controlled admission of air or gas containing $SO_2$, $O_2$ and $N_2$.

7. A process as claimed in claim 2, wherein calcination is carried out by direct heating, the product to be calcined being laid out in layers from 5 to 50 mm thick.

8. A process as claimed in claim 7, wherein direct heating is carried out by the combustion of hydrocarbons, sulfur and/or $H_2S$.

9. A process as claimed in claim 8, wherein the rate of flow of hot gases in contact with the products to be calcined is less than 5m per second.

10. A process as claimed in claim 9, wherein direct heating is carried out in a cylinder-shaped furnace with smooth inside wall, such cylinder rotating around the main axis thereof.

11. A process as claimed in claim 2, wherein calcination is carried out in a fluidised layer furnace.

12. A process as claimed in claim 2, wherein ferrous sulfate is added to the basic iron sulfate and/or jarosite to be calcined.

13. A process as claimed in claim 2, wherein sulfur is added to the basic iron sulfate and/or jarosite to be calcined.

14. A process as claimed in claim 2, wherein the product to be calcined is agglomerated into pellets.

15. A process as claimed in claim 2, comprising calcining basic iron sulfate and/or jarosite based residues resulting from the preparation of zinc sulfate solutions from roasted blende and to be used for electrolysis in zinc extraction.

16. Iron oxide based pigment in alpha-$Fe_2O_3$ form, comprising the water insoluble part of the lixiviated product obtained by the process of claim 1.

17. A pigment according to claim 16 which is not a highly purified iron oxide.

* * * * *